United States Patent
Kim et al.

(10) Patent No.: US 10,112,796 B2
(45) Date of Patent: Oct. 30, 2018

(54) METHOD AND APPARATUS FOR MANUFACTURING AEROGEL SHEET

(71) Applicant: LG CHEM, LTD., Seoul (KR)

(72) Inventors: Ye Hon Kim, Daejeon (KR); Je Kyun Lee, Daejeon (KR); Kyoung Shil Oh, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/564,964

(22) PCT Filed: Oct. 31, 2016

(86) PCT No.: PCT/KR2016/012403
§ 371 (c)(1),
(2) Date: Oct. 6, 2017

(87) PCT Pub. No.: WO2017/126784
PCT Pub. Date: Jul. 27, 2017

(65) Prior Publication Data
US 2018/0086587 A1    Mar. 29, 2018

(30) Foreign Application Priority Data

Oct. 18, 2016 (KR) ........................ 10-2016-0134939

(51) Int. Cl.
| | |
|---|---|
| *C01B 33/152* | (2006.01) |
| *C01B 33/158* | (2006.01) |
| *B29C 41/28* | (2006.01) |
| *B65H 35/06* | (2006.01) |
| *B65H 37/00* | (2006.01) |

(Continued)

(52) U.S. Cl.
CPC ............ *B65H 35/06* (2013.01); *B29C 39/00* (2013.01); *B29C 41/28* (2013.01); *B29C 41/30* (2013.01); *B65H 37/00* (2013.01); *C01B 33/141* (2013.01); *C01B 33/152* (2013.01);
(Continued)

(58) Field of Classification Search
CPC .......... B29K 2105/0061; C01B 33/141; C01B 33/152; C01B 33/158; C01B 33/1585; B65H 35/06; B65H 37/00
See application file for complete search history.

(56) References Cited

U.S. PATENT DOCUMENTS

| | | |
|---|---|---|
| 3,895,087 A | 7/1975 | Ottinger et al. |
| 5,789,075 A | 8/1998 | Frank et al. |

(Continued)

FOREIGN PATENT DOCUMENTS

| | | |
|---|---|---|
| CN | 1839024 | 9/2006 |
| CN | 103102135 | 5/2013 |

(Continued)

*Primary Examiner* — Robert B Davis
(74) *Attorney, Agent, or Firm* — Dentons US LLP

(57) ABSTRACT

The present invention relates to a method for manufacturing an aerogel sheet. The method for manufacturing the aerogel sheet includes: a step (a) of preparing silica sol; a step (b) of preparing a gelling catalyst; a step (c) of injecting the silica sol, which is prepared in the step (a), to a surface of a blanket to impregnate the silica sol; a step (d) of injecting the gelling catalyst, which is prepared in step (b), to the surface of the blanket, into which the silica sol is impregnated, to gelate the silica sol; and a step (e) of cutting the blanket, in which the silica sol is gelated, to obtain a sheet in which the silica sol is gelated.

20 Claims, 4 Drawing Sheets

(51) Int. Cl.
  *C01B 33/141* (2006.01)
  *B29C 39/00* (2006.01)
  *B29C 41/30* (2006.01)
  *B29B 15/12* (2006.01)
  *B29K 105/00* (2006.01)

(52) U.S. Cl.
  CPC ........ *C01B 33/158* (2013.01); *C01B 33/1585* (2013.01); *B29B 15/122* (2013.01); *B29K 2105/0061* (2013.01)

(56) References Cited

U.S. PATENT DOCUMENTS

| | | | |
|---|---|---|---|
| 6,319,852 | B1 | 11/2001 | Smith et al. |
| 8,663,739 | B2 * | 3/2014 | Yeo ................ C01B 33/155 |
| | | | 427/376.2 |
| 2005/0046086 | A1 | 3/2005 | Lee et al. |
| 2005/0167891 | A1 | 8/2005 | Lee et al. |
| 2006/0270248 | A1 * | 11/2006 | Gould ................ B01J 13/0052 |
| | | | 438/780 |
| 2007/0222116 | A1 | 9/2007 | Gould et al. |
| 2008/0093016 | A1 | 4/2008 | Lee et al. |
| 2012/0025127 | A1 * | 2/2012 | Yeo ................ C01B 33/155 |
| | | | 252/62 |

FOREIGN PATENT DOCUMENTS

| | | |
|---|---|---|
| CN | 103496706 | 1/2014 |
| EP | 0581510 | 2/1994 |
| EP | 2422950 | 2/2012 |
| KR | 10-2011-0082379 A | 7/2011 |
| KR | 10-2011-0126381 | 11/2011 |
| KR | 10-2011-0126381 A | 11/2011 |
| KR | 10-1105436 B | 1/2012 |
| KR | 10-1199958 | 11/2012 |
| KR | 10-1199958 B | 11/2012 |
| KR | 10-2015-0089319 | 8/2015 |
| KR | 10-2015-0089319 A | 8/2015 |
| KR | 10-2015-0090320 A | 8/2015 |
| KR | 10-1774140 | 9/2017 |
| WO | WO-2010143902 A2 * | 12/2010 ........... C01B 33/155 |

* cited by examiner

METHOD AND APPARATUS FOR MANUFACTURING AEROGEL SHEET

CROSS-REFERENCE TO RELATED APPLICATION

This application is a National Stage Entry of International Application No. PCT/KR2016/012403, filed on Oct. 31, 2016, and claims the benefit of Korean Application No. 10-2016-0006342, filed on Jan. 19, 2016, and Korean Application No. 10-2016-0134939, filed on Oct. 18, 2016, all of which are hereby incorporated by reference in their entirety for all purposes as if fully set forth herein.

TECHNICAL FIELD

The present invention relates to a method and apparatus for manufacturing an aerogel sheet, and more particularly, to a method and apparatus for manufacturing an aerogel sheet having excellent heat insulation and durability and having a uniform thickness and shape.

BACKGROUND ART

In general, aerogel is a high porosity material having high porosity of about 90% to about 99% in solids that are known up to date. A silica precursor solution is subjected to sol-gel polymerization reaction to from gel, and then, drying process is performed on the formed gel under supercritical or atmospheric conditions to obtain the aerogel. That is, aerogel has a pore structure filled with air.

The above-described aerogel is lightweight and has physical properties such as heat insulation and sound absorption due to the unique pore structure in which 90% to 99% of an internal space is empty. The greatest advantage of the above-described advantages is the high heat insulation having thermal conductivity of 30 mW/m.k or less, which is significantly lower than thermal conductivity of 36 mW/m.k that is thermal conductivity of an organic insulation material such as conventional Styrofoam and the like.

DISCLOSURE OF THE INVENTION

Technical Problem

There are problems that the aerogel has poor heat insulation and durability, and particularly, a sheet has a nonuniform thickness and shape.

The present invention has been made to solve the above-mentioned problems, and an object of the prevent invention is to provide a method and apparatus for manufacturing an aerogel sheet having excellent heat insulation and durability and having a uniform thickness and shape.

Technical Solution

To achieve the above-described object, a method for manufacturing an aerogel sheet according to a first embodiment of the present invention includes: a step (a) of preparing silica sol; a step (b) of preparing a gelling catalyst; a step (c) of injecting the silica sol, which is prepared in the step (a), to a surface of a blanket to impregnate the silica sol; a step (d) of injecting the gelling catalyst, which is prepared in step (b), to the surface of the blanket, into which the silica sol is impregnated, to gelate the silica sol; and a step (e) of cutting the blanket, in which the silica sol is gelated, to obtain a sheet in which the silica sol is gelated.

In the step (a), tetraethyl orthosilicate (TEOS) and ethanol may be mixed to prepare the silica sol.

The tetraethyl orthosilicate (TEOS) may include hydrolyzed TEOS.

In the step (b), ethanol and ammonia water ($NH_4OH$) may be mixed to prepare the gelling catalyst.

The step (c) and the step (d) may be performed within a conveyor belt that transfers the blanket from one side to the other side thereof.

The conveyor belt may include a scraper including a first scraper adjusting a thickness of the silica sol injected to the surface of the blanket and a second scraper adjusting a thickness of the gelling catalyst injected to the surface of the blanket.

In the step (d), the gelling catalyst may be injected to the surface of the blanket at a rate of 0.035 L/min to 0.012 L/min to leave the gelling catalyst for a time of 8 minutes to 12 minutes and thereby to gelate the silica sol.

In the step (e), the blanket in which the silica sol is gelated may be continuously cut to the same size by using a cutting device provided with a cutting blade that reciprocates vertically to manufacture the sheet in which the silica sol is gelated.

After the step (e), the method may further include a step (f) of aging the sheet in which the silica sol is gelated.

In the step (f), the sheet in which the silica sol is gelated may be aged at a temperature of 70° C. and aged for 50 minutes.

In the sheet aging step (f), the sheet in which the silica sol is gelated may be left at room temperature for 10 minutes to perform the aging.

After the step (f), the method may further include a step (g) of injecting a coating solution to the aged sheet to modify a surface of the sheet.

In the step (g), the coating solution may be prepared by mixing ethanol with ammonia water ($NH_4OH$).

The coating solution may be injected with 1.6 times of the silica sol impregnated into the surface of the blanket in the step (c), and the aging may be performed at a high temperature of 70° C. for one hour in a reaction vessel to modify the surface of the blanket by using hexamethyldisilazane (HMDS).

After the step (g), the method may further include a step (h) of drying the sheet of which the surface is modified.

The step (h) may include a first drying step of injecting carbon dioxide at a rate of 70 L/min for ten minutes under environments of a temperature of 28° C. and a pressure of 70 bar to dry the sheet of which the surface is modified, a second drying step of raising to a temperature of 50° C. for 1 hour and 20 minutes to dry the sheet again, a third drying step of injecting carbon dioxide at a rate of 0.7 L/min for 20 minutes under a temperature of 50° C. and a pressure of 150 bar to dry the sheet, and a fourth drying step of injecting carbon dioxide at a rate of 0.7 L/min for 20 minutes after breaking for 20 minutes to dry the sheet.

In the third drying step of the step (h), the ethanol generated from the sheet of which the surface is modified may be collected while injecting the carbon dioxide.

The step (h) may further include a step of discharging the carbon dioxide for 2 hours after the fourth drying step.

The steps (f), (g), and (h) may be performed in a reaction vessel accommodating the sheet.

A method for manufacturing an aerogel sheet according to a second embodiment of the present invention includes: a step (A) of continuously mixing silica sol with gelling catalyst to form catalyzed sol; a step (B) of supplying at least one fiber material; a step (C) of distributing the catalyzed sol onto a moving element to gelate the catalyzed sol on the moving element, thereby forming a gel sheet, wherein the fiber material is mixed with the catalyzed sol before the gelation; a step (D) of cutting the gel sheet in which the catalyzed sol is gelated to manufacturing a sheet in which the catalyzed sol is gelated.

In the step (D), the gel sheet may be continuously cut to the same size by a cutting device including a cutting blade that reciprocates vertically to manufacture a sheet in which the catalyzed sol is gelated.

The silica sol may include a material selected from the group consisting of an inorganic material, an organic material, and a combination of the inorganic material and the organic material.

The moving element may include an end for supporting the catalyzed sol.

The inorganic material may be selected from the group consisting of zirconia, yttrium oxide, hafnia, alumina, titania, ceria, silica, magnesium oxide, calcium oxide, magnesium fluoride, calcium fluoride, and combinations thereof.

The organic material may be selected from the group consisting of polyacrylate, polyolefin, polystyrene, polyacrylonitrile, polyurethane, polyimide, polyfurfural alcohols, phenol furfuryl alcohol, melamine formaldehyde, resorcinol formaldehyde, cresol formaldehyde, phenol formaldehyde, polyvinyl alcohol dialdehyde, polycyanurate, polyacrylamide, various epoxies, agar, agarose, and combinations thereof.

The fiber material may include a fiber selected from the group consisting of an inorganic material, an organic material, and a combination of the inorganic material and the organic material.

The fiber material may include a fiber having a diameter in the range of 0.1 μm to 10,000 μm.

The fiber material may include a fiber having a diameter in the range of 0.001 μm to 100 μm.

The method may further include a step of distributing corrugated fibers over the gel sheet.

A manufacturing apparatus for performing the method for manufacturing the aerogel sheet according to the first embodiment of the present invention includes: a supply roller around which a blanket is wound in the form of roll; a conveyor belt transferring the blanket wound around the supply roller from one side to the other side thereof; a silica sol supply member injecting the silica sol to a surface of the blanket disposed on the conveyor belt to impregnate the silica sol; a catalyst supply member injecting a gelling catalyst to the surface of the blanket disposed on the conveyor belt to gelate the silica sol; a cutting member including a cutting blade cutting the blanket, which is transferred to the other side by the conveyor belt, to obtain a sheet; and a reaction vessel which accommodates the sheet and in which the accommodated sheet is aged, modified by injecting a coating solution, or dried at a high temperature.

Advantageous Effects

The present invention has effects as follows.

First: the present invention may use the method for manufacturing the aerogel sheet to obtain the aerogel sheet having the same size, thickness, and shape, and particularly, obtain the aerogel sheet having the superior insulation and durability.

Second: in the method for manufacturing the aerogel sheet according to the present invention, the tetraethyl orthosilicate (TEOS) and the ethanol may be mixed to prepare the silica sol having the high quality.

Third: in the method for manufacturing the aerogel sheet according to the present invention, the hydrolyzed TEOS may be used to obtain the silica sol having the high quality.

Fourth: in the method for manufacturing the aerogel sheet according to the present invention, the ethanol and the ammonia water ($NH_4OH$) may be mixed to prepare the gelling catalyst having the high quality.

Fifth: in the method for manufacturing the aerogel sheet according to the present invention, the conveyor belt for transferring the blanket from one side to the other side thereof may be used to achieve the continuity of the operation and the simplification of the process.

Sixth: in the method for manufacturing the aerogel sheet according to the present invention, the scraper may be provided on the conveyor belt to uniformly adjust the thickness of the silica sol or the gelling catalyst.

Seventh: in the method for manufacturing the aerogel sheet according to the present invention, the sheet in which the silica sol is gelated may be aged and then dried after the surface modification to obtain the aerogel sheet having the high quality.

MODE FOR CARRYING OUT THE INVENTION

Figure 1:
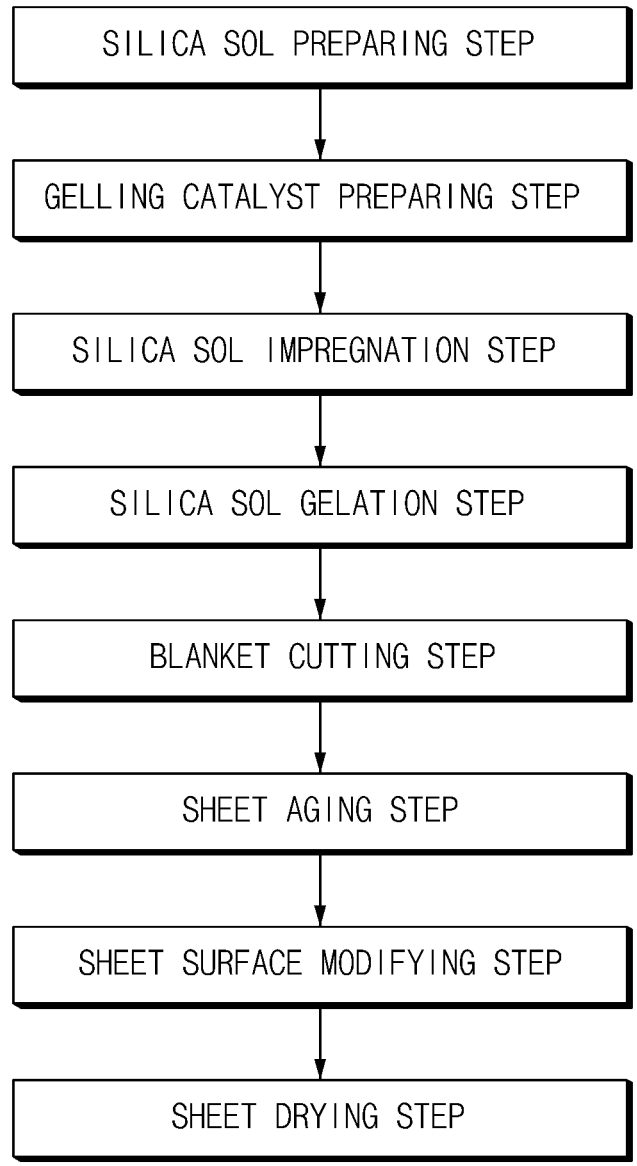
FIG. 1 is a flowchart illustrating a method for manufacturing an aerogel sheet according to a first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Method for Manufacturing Aerogel Sheet According to First Embodiment of the Present Invention]

A method for manufacturing an aerogel sheet according to a first embodiment of the present invention includes, as illustrated in FIG. 1, a silica sol preparing step (a) of preparing silica sol, a gelling catalyst preparing step (b) of preparing a gelling catalyst, a silica sol impregnation step (c) of injecting the silica sol to a surface of a blanket to impregnate the silica sol, a silica sol gelation step (d) of injecting the gelling catalyst to the surface of the blanket, into which the silica sol is impregnated, to gelate the silica sol, a blanket cutting step (e) of cutting the blanket, in which the silica sol is gelated, to obtain a sheet, a sheet aging step (f) of aging the sheet in which the silica sol is gelated, a sheet surface modifying step (g) of applying a coating solution to the aged sheet to modify the surface, and a sheet drying step (h) of drying the sheet of which the surface is modified.

Hereinafter, the method for manufacturing the aerogel sheet according to the first embodiment of the present invention will be described in more detail.

(a) Silica Sol Preparing Step

The silica sol preparing step (a) is a step of obtaining the silica sol. Here, tetraethyl orthosilicate (TEOS) and ethanol are mixed to prepare the silica sol. That is, 1.2 kg of TEOS and 2.7 kg of ethanol are provided in a reaction bath (not shown) to prepare the silica sol.

The TEOS may use a solvent having high reactivity with water and be hydrolyzed to improve reactivity. That is, the hydrolyzed TEOS and the ethanol may be mixed to obtain the silica sol having excellent reactivity.

(b) Gelling Catalyst Preparing Step

The gelling catalyst preparing step (b) is a step of obtaining the gelling catalyst. Here, ethanol and ammonia water ($NH_4OH$) are mixed to prepare the gelling catalyst. That is, 0.5 kg of ethanol and 30 ml of ammonia water ($NH_4OH$) are mixed in the reaction bath (not shown) to prepare the gelling catalyst.

Figure 2:
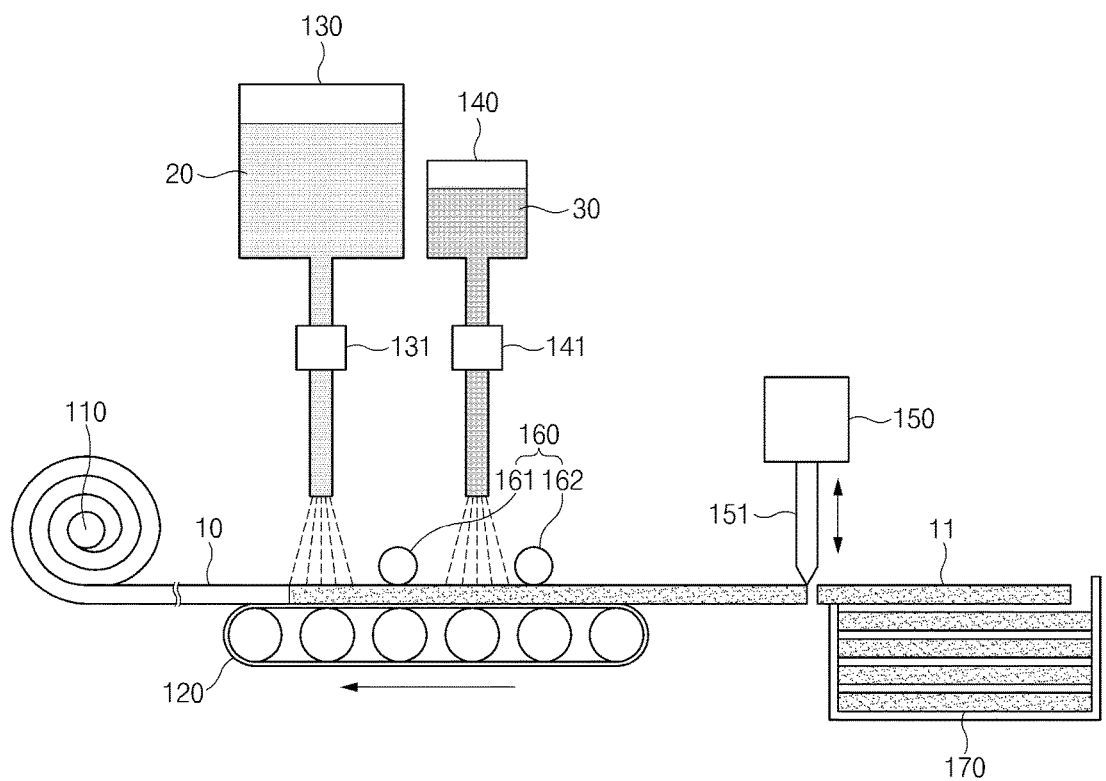
FIG. 2 is a view illustrating an apparatus of manufacturing the aerogel sheet according to the first embodiment of the present invention.

FIG. 2 is a view illustrating an apparatus 100 for manufacturing the aerogel sheet, in which the silica sol impregnation step (c), the silica sol gelation step (d), and blanket cutting step (e) are performed according to the present invention.

That is, as illustrated in FIG. 2, the apparatus 100 of manufacturing the aerogel sheet includes a supply roller 110 around which a blanket 10 is wound in the form of roll, a conveyor belt 120 for transferring the blanket 10 wound around the supply roller 110 from one side to the other side thereof, a silica sol supply member 130 for injecting the silica sol 20, which is prepared in the step (a), to a surface of the blanket 10 disposed on the conveyor belt 120 the silica sol 20, a catalyst supply member 140 for injecting a gelling catalyst 30, which is prepared in the step (b), to a surface of the blanket 10 disposed on the conveyor belt 120 to impregnate the silica sol 20, to gelate the silica sol, and a cutting member 150 for continuously cutting the blanket 10, which is transferred to the other side by the conveyor belt 120, into the same size to obtain a sheet 11. The cut sheet 11 may be loaded in a storage box 170.

Here, the cutting member 150 is disposed on the other end of the conveyor belt 120 and a cutting blade 151 that successively reciprocates in a vertical direction. That is, the cutting blade 151 continuously cuts the blanket 10, which moves to the other side of the conveyor belt 120, into the same size while reciprocating in the vertical direction.

The silica sol supply member 130 or the catalyst supply member 140 may be provided with control valves 131 and 141 for controlling an amount of silica sol or catalyst to be injected. Also, the silica sol supply member 130 or the catalyst supply member 140 may be provided with pressure control parts 132 and 142 for controlling an internal pressure to control an injection rate of silicon sol or catalyst.

In the apparatus 100 for manufacturing the aerogel sheet, when the supply roller 110 supplies the wound blanket 10, the conveyor belt 120 transfers the blanket 10 supplied by the supply roller 110 from one side to the other side thereof. Here, the silica sol supply member 130 injects the silica sol 20 prepared in the step (a) to the surface of the blanket 10 transferred by the conveyor belt 120 to impregnate the silica sol. Also, the catalyst supply member 140 injects the gelling catalyst 30 to the surface of the blanket 10 in which the silica sol is impregnated to gelate the silica sol, and the blanket 10 in which the silica sol is gelated is continuously cut to a predetermined size to manufacture a sheet 11 in which the silica sol is gelated. The sheet 11 in which the silica sol is gelated may be loaded and stored in the storage box 170.

Here, a scraper 160 for uniformly adjusting a thickness of each of the silica sol 20 injected to the blanket 10 and the gelling catalyst 30 may be provided on the conveyor belt 120. That is, the scraper 160 includes a first scraper 161 uniformly adjusting a thickness of the silica sol 20 injected to the surface of the blanket 10 and a second scraper 162 uniformly adjusting a thickness of the gelling catalyst 30 injected to the surface of the blanket 10.

That is, the first scraper 161 and the second scraper 162 may have the same shape and be installed to be adjustable in height on a top surface of the conveyor belt 120 to uniformly adjust the thickness of each of the silica sol 20 and the gelling catalyst 30. Here, the first scraper 161 may be disposed on the top surface of the conveyor belt 120 between a silica sol supply member 130 and a catalyst supply member 140, and the second scraper 162 may be disposed on the top surface of the conveyor belt 120 between the catalyst supply member 140 and a cutting member 150.

Hereinafter, a silica sol impregnation step (c), a silica sol gelling step (d), and a blanket cutting step (e) using the apparatus 100 for manufacturing the aerogel sheet will be described in detail.

(c) Silica Sol Injection Step

In the silica sol injection step (c), the silica sol prepared in the step (a) is injected to the surface of the blanket and impregnated. That is, the silica sol 20 prepared in the step (a) is injected into and stored in the silica sol supply member 130. Then, when the blanket 10 wound around the supply member 110 is transferred up to a lower side of the silica supply member 130 by the conveyor belt 120, the silica sol 20 is injected through the silica sol supply member 130 and impregnated into the surface of the blanket 10.

Here, the silica sol 20 injected to the blanket 10 may have a uniform thickness while passing through the first scraper 161 installed on the conveyor belt 120. That is, the first scraper 161 may uniformly adjust the thickness of the silica sol 20 by blocking the silica sol 20 having a predetermined thickness or more so that the silica sol 20 does not pass.

(d) Gelling Catalyst Injection Step

In the gelling catalyst injection step (c), the gelling catalyst 30 is injected to the surface of the blanket 10 in which the silica sol is impregnated in the step (c) to gelate the silica sol. That is, the gelling catalyst 30 prepared in the step (b) is injected into and stored in the catalyst supply member 140. Then, when the blanket 10 into which the silica sol is impregnated is transferred up to a lower side of the catalyst supply member 140 by the conveyor belt 120, the gelling catalyst 30 is injected to the surface of the blanket 10 through the catalyst supply member 140 to gelate the silica sol.

Here, the catalyst supply member 140 may inject the stored gelling catalyst at a preset rate and then leave the gelling catalyst 30 for a preset time to stably gelate the silica sol. That is, the catalyst supply member 140 may inject the gelling catalyst 30 to the surface of the blanket 10 at a rate of 0.035 L/min to 0.012 L/min and then leave the gelling catalyst 30 for a time of 8 minutes to 12 minutes to gradually gelate the silica sol.

Particularly, as illustrated in FIG. 2, the catalyst supply member 140 may uniformly adjust the gelation of the silica sol by varying the injection rate of the gelling catalyst 30 according to density of the silica sol 20 impregnated in the blanket 10.

(e) Step of Cutting Blanket in which Silica Sol is Gelated (e) In the step of cutting the blanket in which the silica sol is gelated, the blanket 10 in which the silica sol is gelated by the catalyst supply member 140 passes through the cutting member 150, and simultaneously, a cutting blade 151 of the cutting member 150 descends to cut the surface of the blanket 10 disposed below the cutting member 150, thereby obtaining a sheet 11 in which the silica sol is gelated.

The sheet 11 in which the cut silica sol is gelated undergoes a sheet aging step (f), a sheet surface modification step (g), and a sheet drying step (h) to complete an aerogel sheet. Here, a reaction vessel 180 is used.

Figure 3:
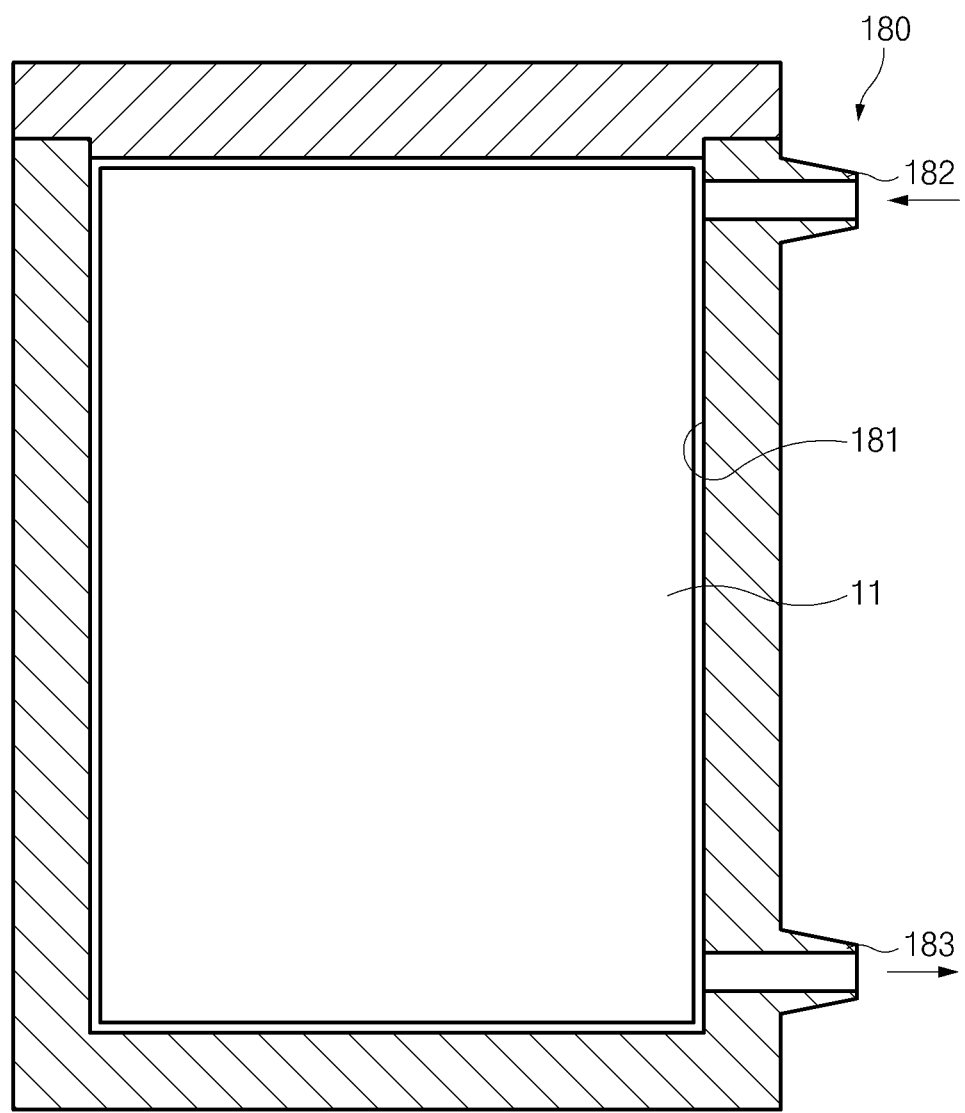
FIG. 3 is a cross-sectional view of a reaction vessel provided in the apparatus of manufacturing the aerogel sheet according to the first embodiment of the present invention.

FIG. 3 is a cross-sectional view of the reaction vessel 180 according to the first embodiment of the present invention.

That is, the reaction vessel 180 has an accommodation space 181 in which a plurality of sheets 11, each of which is cut to a predetermined size, are accommodated to be sealed, an injection hole 182 having one end connected to the accommodation space 181, and a discharge hole 183 having the other end connected to the accommodation space 181.

Hereinafter, a sheet aging step (f), a sheet surface modification step (g), and a sheet drying step (h) using the reaction vessel 180 will be described.

(f) Sheet Aging Step

In the sheet aging step (f), the sheet in which the silica sol is gelated is aged. That is, the plurality of sheets 11 in which the silica sol is gelated and which are cut in the step (e) are accommodated in the accommodation space 181 of the reaction vessel 180, and then, the accommodation space 181 of the reaction vessel 180 is heated up to a temperature of 70° C. and aged for 50 minutes to uniformize tissues of each of the sheets 11.

Here, in the sheet aging step (f), the sheet is left at room temperature (or a temperature of 25° C.) for 10 minutes before the aging is performed in the reaction vessel 180 to perform the aging. That is, the aging for inducing the stable gelation of the silica sol may be performed to more uniformize the tissues of the sheet 11.

(g) Sheet Surface Modification Step

In the sheet surface modification step (g), a coating solution is injected to the aged sheet 11 to modify a surface of the sheet 11. That is, in the sheet surface modification step (g), ethanol and ammonia water ($NH_4OH$) are mixed to prepare the coating solution. Then, the coating solution is injected into the accommodation space 181 through the injection hole 182 of the reaction vessel 180 in which the sheet 11 is loaded to modify a surface of the sheet 11. Here, the coating solution is injected with 1.6 times of the silica sol impregnated into the surface of the blanket in the step (c), and the aging is performed at a high temperature of 70° C. for one hour in the reaction vessel 180 to modify the surface of the sheet 11 by using hexamethyldisilazane (HMDS).

The hexamethyldisilazane (HMDS) is used to modify the surface of the sheet into hydrophobicity.

(h) Sheet Drying Step

In the sheet drying step (h), the sheet 11 of which the surface is modified is dried to complete a silica gel sheet. Here, in the sheet drying step (h), supercritical drying is performed in the state in which the sheet 11 is accommodated in the reaction vessel 180. That is, the sheet drying step (h) includes a first drying step of injecting carbon dioxide at a rate of 70 L/min for ten minutes under environments of a temperature of 28° C. and a pressure of 70 bar to dry the sheet 11, a second drying step of raising to a temperature of 50° C. for 1 hour and 20 minutes to dry the sheet 11, a third drying step of injecting carbon dioxide at a rate of 0.7 L/min for 20 minutes again under a temperature of 50° C. and a pressure of 150 bar to dry the sheet 11, and a fourth drying step of injecting carbon dioxide at a rate of 0.7 L/min for 20 minutes after breaking for 20 minutes to dry the sheet 11. The above-described drying steps may be performed to increase a drying rate of the sheet 11.

In the third drying step of the sheet drying step (h), ethanol is generated in the reaction vessel 180 by chemical reaction between carbon dioxide and the sheet 11, and the ethanol generated in the reaction vessel 180 is discharged through the discharge hole 183 and then is collected.

Also, the sheet drying step (h) includes a discharging step of discharging the carbon dioxide for 2 hours after the fourth drying step. Thus, a gradual environmental change is inducted in the sheet 11 to uniformize the tissues of the sheet 11.

When the method for manufacturing the aerogel sheet according to the first embodiment of the present invention is completed, an aerogel sheet having uniform thickness, size, and shape and having high heat insulation and durability may be obtained.

Hereinafter, in descriptions of another embodiment of the present invention, constituents having the same function have been given with the same reference numeral in the drawings, and thus their duplicated descriptions will be omitted.

[Method for Manufacturing Aerogel Sheet According to Second Embodiment of the Present Invention]

In a method for manufacturing an aerogel sheet according to a second embodiment of the present invention includes a step (A) of continuously mixing silica sol with gelling catalyst to form catalyzed sol, a step (B) of supplying at least one fiber material, a step (C) of distributing the catalyzed sol onto a moving element to gelate the catalyzed sol on the moving element, thereby forming a gel sheet, and a step (D) of cutting the gel sheet in which the catalyzed sol is gelated to manufacturing a sheet in which the catalyzed sol is gelated. The fiber material may be mixed with the catalyzed sol before being gelated.

Figure 4:
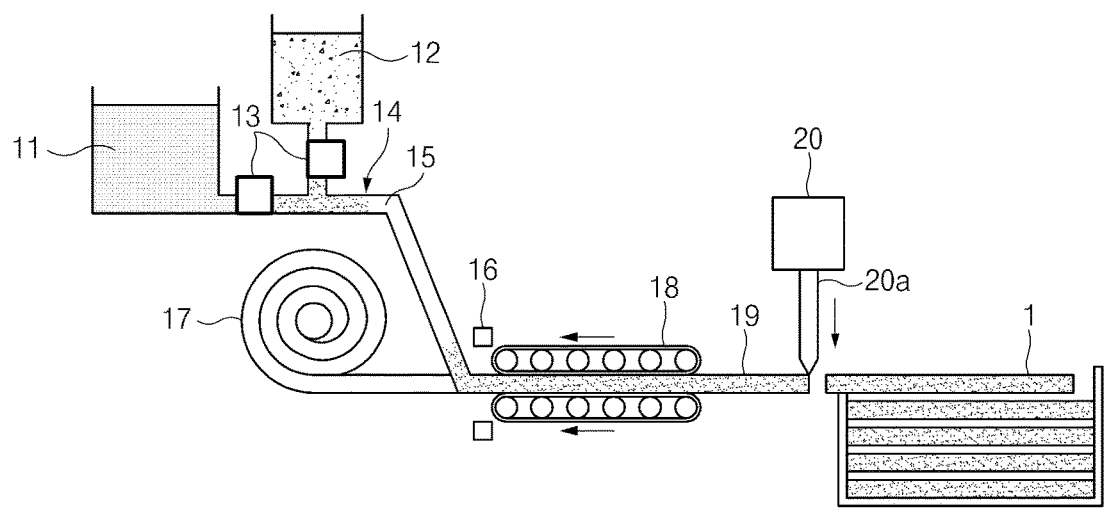
FIG. 4 is a view illustrating a method for manufacturing an aerogel sheet according to a second embodiment of the present invention.

Reference numerals shown in FIG. 4 are as follows. Reference numeral 11 represents stable silica sol, reference numeral 12 represents gelling catalyst for inducing gelation of the sol when an appropriate amount of sol is added under controlled conditions, reference numeral 13 represents a flow control position, reference numeral 14 represents a fixed mixer, reference numeral 15 represents a position in a fluid mixing system in which the silica sol is completely mixed with the gelling catalyst, reference numeral 16 represents a scraper/lubricant device (optional), reference numeral 17 represents a fiber battering material that is a fiber material (may be a separation sheet or roll supplied to the assembly), reference numeral 18 represents a counter rotation conveyor belt that are two moving elements forming a molding surface according to a length by which the gelation occurs before cutting the gel sheet in which the catalyzed sol is gelated.

In the method for manufacturing the aerogel sheet according to the second embodiment of the present invention, a low viscosity solution of the silica sol and the gelling catalyst (a thermal catalyst or a chemical catalyst) which induces gel formation are continuously mixed with each other, and the catalyzed sol is distributed at a preset rate so that the gelation effectively occurs on the moving element. That is, a method for forming the gel sheet on the conveyor belt having an end defining a volume of the gel sheet is described.

The silica sol includes an inorganic material, an organic material, and a combination of a mixture of inorganic/ organic materials, and the inorganic material includes zirconia, yttrium oxide, hafnia, alumina, titania, ceria, silica, magnesium oxide, calcium oxide, magnesium fluoride, calcium fluoride, and combinations thereof.

The organic material includes polyacrylate, polyolefin, polystyrene, polyacrylonitrile, polyurethane, polyimide, polyfurfural alcohols, phenol furfuryl alcohol, melamine formaldehyde, resorcinol formaldehyde, cresol formaldehyde, phenol formaldehyde, polyvinyl alcohol dialdehyde, polycyanurate, polyacrylamide, various epoxies, agar, agarose, and combinations thereof.

Also, this method describes formation of a fiber-reinforced gel composite having a monolithic gel sheet or two parts, i.e., a reinforced fiber and a gel matrix. The reinforced fiber material has a high-grade fiber structure, i.e., based on a batting shape, preferably, thermoplastic polyester or silica fibers, and more preferably, is mixed with short fibers (microfibers) which are arbitrarily distributed continuously or semicontinuously. The battering or matting material of the fibers is introduced onto the moving element so as to be mixed with the catalyzed sol before the gelation.

Furthermore, when the gel matrix is reinforced by a high-grade batting material, particularly, a continuous nonwoven batting material composed of very low denier fibers, the final composite material is maintained in similar thermal properties with respect to monolithic aerogel or xerogel in a stronger and more durable form when dried in an aerogel or xerogel product by solvent extraction. The used fiber has a diameter in the range of 0.1 micron to 10,000 microns. In some cases, nanofibers in the range of 0.001 microns to 100 microns are used for gel enhancement. In addition to the fiber batting, corrugated fibers may be distributed throughout the gel structure.

The high-grade batting is limited to a fiber material having a volume (with or without maximum volume resilience) and any resilience properties. The referred form of this material may be a soft fabric. The use of the high-grade batting material prevents the aerogel from substantially degraded in thermal performance and also minimize a volume of the aerogel that is not supported. It is preferred that the battering is used as a lining quilt, for filling or packaging, or provided as a layer or sheet of a fiber material that is commonly used as an insulation material for thermal insulation.

Also, the high-grade battering and the fiber material for forming a layer having tensile strength in an X-Y direction include any fiber formation material selected from the group consisting of an inorganic material, an organic material, and a combination of the inorganic material and the organic material. The appropriate material includes glass fibers, quartz, polyester (PET), polyethylene, polypropylene, polybenzimidazole (PBI), polyphenylenebenzo-bisoxazole (PBO), polyetherether ketone (PEEK), polyarylate, polyacrylate, polytetrafluoroethylene (PTEE), poly-metaphenylene diamine (Nomex), polyparaphenylene terephthalamide (Kevlar), ultra-high molecular polyethylene (UHMWPE), for example, spectra TM, novolide resin (Knyol), polyacrylonitrile (PAN), PAN/carbon, and carbon fibers.

Also, this method describes a method for forming a gel composite continuously or semicontinuously by introduction of an energy decomposition zone on a moving conveyor device. The gelation of the catalyzed sol may be enhanced by a chemical or energy decomposition process. For example, a controlled flux of electromagnetic (ultraviolet, visible, infrared, microwave), sonic (ultrasonic), or particulate radiation may be introduced over a width of a volume of the accommodated sol moving by the conveyor belt to induce sufficient cross-linking of a polymer contained in the silica sol so as to obtain a gel point. The flux, point and area of the radiation may be controlled according to a transport device for obtaining an optimized casting ratio and desired gel properties until an end of the conveyor belt reaches a given portion of the gel. In this way, the gel properties may be controlled in a new way as far as the extents that are impossible with a batch casting method. Furthermore, other moving elements rotating in a direction opposite to a first moving element may be used to provide a shape of an upper portion of the gel sheet.

That is, in the method for manufacturing the aerogel sheet according to the second embodiment of the present invention, referring to FIG. 4, the fiber reinforced gel sheet may be manufactured continuously or semicontinuously by using the silica sol distribution and catalyst mixing system and the counter rotation conveyor device. Here, when the gel sheet in which the catalyzed sol is gelated is continuously cut at the end of the belt, the sheets in which the catalyzed sol is gelated and which have the same size may be manufactured.

Here, in the step (D) of cutting the gel sheet in which the silica sol is gelated, the gel sheet in which the silica sol is gelated passes through a cutting member 20, and simultaneously, a cutting blade 20*a* of the cutting member 20 descends to cut a surface of the gel sheet disposed below the cutting member 20, thereby obtaining a sheet 1 in which the silica sol is gelated.

The sheet 1 in which the cut silica sol is gelated undergoes a sheet aging step (E), a sheet surface modification step (F), and a sheet drying step (G) to complete an aerogel sheet. Here, the reaction vessel 180 of FIG. 3 is used.

In the sheet aging step (E), the gel sheet in which the silica sol is gelated is aged. That is, the plurality of sheets 1 in which the silica sol is gelated and which are cut in the step (D) are accommodated in the accommodation space 181 of the reaction vessel 180, and then, the accommodation space 181 of the reaction vessel 180 is heated up to a temperature of 70° C. and aged for 50 minutes to uniformize tissues of each of the sheets 1.

Here, in the sheet aging step (E), the sheet is left at room temperature (or a temperature of 25° C.) for 10 minutes before the aging is performed in the reaction vessel 180 to perform the aging. That is, the aging for inducing the stable gelation of the silica sol may be performed to more uniformize the tissues of the sheet 1.

In the sheet surface modification step (F), a coating solution is injected to the aged sheet 1 to modify a surface of the sheet 1. That is, in the sheet surface modification step (F), ethanol and ammonia water ($NH_4OH$) are mixed to prepare a coating solution. Then, the coating solution is injected into the accommodation space 181 through the injection hole 182 of the reaction vessel 180 in which the sheet 1 is loaded to modify a surface of the sheet 1. Here, the coating solution is injected with 1.6 times of the silica sol impregnated into the surface of the fiber material in the step (B), and the aging is performed at a high temperature of 70° C. for one hour in the reaction vessel 180 to modify the surface of the sheet 1 by using hexamethyldisilazane (HMDS).

The hexamethyldisilazane (HMDS) is used to modify the surface of the gel sheet into hydrophobicity.

In the sheet drying step (G), the modified sheet 1 is dried to complete a silica gel sheet. Here, in the sheet drying step (G), supercritical drying is performed in a state in which the sheet 1 is accommodated in the reaction vessel 180. That is, the sheet drying step (G) includes a first drying step of injecting carbon dioxide at a rate of 70 L/min for ten minutes under environments of a temperature of 28° C. and a pressure of 70 bar to dry the sheet 1, a second drying step of raising to a temperature of 50° C. for 1 hour and 20 minutes to dry the sheet 1, a third drying step of injecting carbon dioxide at a rate of 0.7 L/min for 20 minutes again under a temperature of 50° C. and a pressure of 150 bar to dry the sheet 1, and a fourth drying step of injecting carbon dioxide at a rate of 0.7 L/min for 20 minutes after breaking for 20 minutes to dry the sheet 1. The above-described drying steps may be performed to increase a drying rate of the sheet 1.

In the third drying step of the sheet drying step (G), ethanol is generated in the reaction vessel 180 by chemical reaction between carbon dioxide and the sheet 1, and the ethanol generated in the reaction vessel 180 is discharged through the discharge hole 183 and then is collected.

Also, the sheet drying step (G) includes a discharging step of discharging the carbon dioxide for 2 hours after the fourth drying step. Thus, a gradual environmental change is inducted in the sheet 1 to uniformize the tissues of the sheet 1.

Thus, when the method for manufacturing the aerogel sheet according to the second embodiment of the present invention is completed, the sheet 1 having uniform thickness, size, and shape and having high heat insulation and durability may be obtained.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A method for manufacturing an aerogel sheet, the method comprising:
    a step (a) of preparing silica sol;
    a step (b) of preparing a gelling catalyst;
    a step (c) of injecting the silica sol, which is prepared in the step (a), to a surface of a blanket to impregnate the silica sol;
    a step (d) of injecting the gelling catalyst, which is prepared in the step (b), to the surface of the blanket, into which the silica sol is impregnated, to gelate the silica sol; and
    a step (e) of cutting the blanket, in which the silica sol is gelated, to obtain a sheet in which the silica sol is gelated,
    wherein the step (c) and the step (d) are performed within a conveyor belt that transfers the blanket from one side to the other side thereof,
    wherein the conveyor belt comprises a scraper comprising a first scraper adjusting a thickness of the silica sol injected to the surface of the blanket and a second scraper adjusting a thickness of the gelling catalyst injected to the surface of the blanket,
    wherein the first scraper and the second scraper may be installed to be adjustable in height on a top surface of the conveyor belt,
    wherein, in the step (d), the gelling catalyst is injected to the surface of the blanket at a rate of 0.035 L/min to 0.012 L/min to leave the gelling catalyst for 8 minutes to 12 minutes and thereby to gelate the silica sol, and
    wherein, in the step (d), the gelation of the silica sol is uniformly adjusted by varying the injection rate of the gelling catalyst according to density of the silica sol impregnated in the blanket.

2. The method of claim 1, wherein, in the step (a), tetraethyl orthosilicate (TEOS) and ethanol are mixed to prepare the silica sol.

3. The method of claim 1, wherein, in the step (e), the blanket in which the silica sol is gelated is continuously cut to the same size by using a cutting device provided with a cutting blade that reciprocates vertically to manufacture the sheet in which the silica sol is gelated.

4. The method of claim 1, after the step (e), further comprising a step (f) of aging the sheet in which the silica sol is gelated.

5. The method of claim 4, wherein, in the step (f), the sheet in which the silica sol is gelated is aged at a temperature of 70° C. and aged for 50 minutes.

6. The method of claim 4, wherein, in the sheet aging step (f), the sheet in which the silica sol is gelated is left at room temperature for 10 minutes to perform the aging.

7. The method of claim 4, after the step (f), further comprising a step (g) of injecting a coating solution to the aged sheet to modify a surface of the sheet.

8. The method of claim 7, wherein, in the step (g), the coating solution is prepared by mixing ethanol with ammonia water ($NH_4OH$).

9. The method of claim 7, wherein the coating solution is injected with 1.6 times of the silica sol impregnated into the surface of the blanket in the step (c), and the aging is performed at a high temperature of 70° C. for one hour in a reaction vessel to modify the surface of the blanket by using hexamethyldisilazane (HMDS).

10. The method of claim 7, after the step (g), further comprising a step (h) of drying the sheet of which the surface is modified.

11. The method of claim 10, wherein the step (h) comprises a first drying step of injecting carbon dioxide at a rate of 70 L/min for ten minutes under environments of a temperature of 28° C. and a pressure of 70 bar to dry the sheet of which the surface is modified, a second drying step of raising to a temperature of 50° C. for 1 minute to 20 minutes to dry the sheet again, a third drying step of injecting carbon dioxide at a rate of 0.7 L/min for 20 minutes under a temperature of 50° C. and a pressure of 150 bar to dry the sheet, and a fourth drying step of injecting carbon dioxide at a rate of 0.7 L/min for 20 minutes after breaking for 20 minutes to dry the sheet.

12. The method of claim 11, wherein, in the third drying step of the step (h), the ethanol generated from the sheet of which the surface is modified is collected while injecting the carbon dioxide.

13. The method of claim 11, wherein the step (h) further comprises a step of discharging the carbon dioxide for 2 hours after the fourth drying step.

14. A method for manufacturing an aerogel sheet, the method comprising:
    a step (A) of continuously mixing silica sol with gelling catalyst to form catalyzed sol;
    a step (B) of supplying at least one fiber material;
    a step (C) of distributing the catalyzed sol onto a moving element to gelate the catalyzed sol on the moving element, thereby forming a gel sheet, wherein the fiber material is mixed with the catalyzed sol before the gelation;
    a step (D) of cutting the gel sheet in which the catalyzed sol is gelated to manufacturing a sheet in which the catalyzed sol is gelated,
    wherein the moving element represents the conveyor belt,
    wherein the conveyor belt comprises a scraper, wherein the scraper comprises a first scraper adjusting a thickness of the silica sol injected to the surface of the blanket and a second scraper adjusting a thickness of the gelling catalyst injected to the surface of the blanket, wherein the first scraper and the second scraper may be installed to be adjustable in height on a top surface of the conveyor belt, wherein, in the step (D), the gelling catalyst is injected to the surface of the blanket at a rate of 0.035 L/min to 0.012 L/min to leave the gelling catalyst for 8 minutes to 12 minutes and thereby to gelate the silica sol, and wherein, in the step (D), the gelation of the silica sol is uniformly adjusted by varying the injection rate of the gelling catalyst according to density of the silica sol impregnated in the blanket.

15. The method of claim 14, wherein the fiber material comprises a fiber having a diameter in the range of 0.1 μm to 10,000 μm.

16. The method of claim 14, further comprising a step of distributing corrugated fibers over the gel sheet.

17. An apparatus of manufacturing an aerogel sheet, the apparatus comprising:
a supply roller around which a blanket is wound in the form of roll;
a conveyor belt transferring the blanket wound around the supply roller from one side to the other side thereof;
a silica sol supply member injecting the silica sol to a surface of the blanket disposed on the conveyor belt to impregnate the silica sol;
a catalyst supply member injecting a gelling catalyst to the surface of the blanket disposed on the conveyor belt to gelate the silica sol;
a cutting member comprising a cutting blade cutting the blanket, which is transferred to the other side by the conveyor belt, to obtain a sheet; and
a reaction vessel which accommodates the sheet and in which the accommodated sheet is aged, modified by injecting a coating solution, or dried at a high temperature, wherein the conveyor belt comprises a scraper comprising a first scraper adjusting a thickness of the silica sol injected to the surface of the blanket and a second scraper adjusting a thickness of the gelling catalyst injected to the surface of the blanket, wherein the first scraper and the second scraper may be installed to be adjustable in height on a top surface of the conveyor belt, wherein the gelling catalyst is injected to the surface of the blanket at a rate of 0.035 L/min to 0.012 L/min to leave the gelling catalyst for 8 minutes to 12 minutes and thereby to plate the silica sol, and wherein the catalyst supply member uniformly adjusts the gelation of the silica sol by varying the injection rate of the gelling catalyst according to density of the silica sol impregnated in the blanket.

18. The method of claim 2, wherein the tetraethyl orthosilicate (TEOS) comprises hydrolyzed TEOS.

19. The method of claim 1, wherein, in the step (b), ethanol and ammonia water ($NH_4OH$) are mixed to prepare the gelling catalyst.

20. The method of claim 10, wherein the steps (f), (g), and (h) are performed in a reaction vessel accommodating the sheet.

* * * * *